(12) United States Patent  (10) Patent No.: US 7,861,937 B2
Lazzerini  (45) Date of Patent: Jan. 4, 2011

(54) METHOD OF MANUFACTURING A SECURITY THREAD HAVING AN EMBEDDED MICROCHIP, SECURITY THREAD AND DOCUMENT COMPRISING THE THREAD

(75) Inventor: Maurizio Lazzerini, Milan (IT)

(73) Assignee: Fabriano Securities S.R.L. (IT)

( * ) Notice: Subject to any disclaimer, the term of this patent is extended or adjusted under 35 U.S.C. 154(b) by 1370 days.

(21) Appl. No.: 10/534,617

(22) PCT Filed: Nov. 12, 2002

(86) PCT No.: PCT/EP02/12643

§ 371 (c)(1),
(2), (4) Date: Nov. 2, 2005

(87) PCT Pub. No.: WO2004/043706

PCT Pub. Date: May 27, 2004

(65) Prior Publication Data

US 2006/0152362 A1 Jul. 13, 2006

(51) Int. Cl.
*G06K 19/06* (2006.01)
*B42D 15/00* (2006.01)
(52) U.S. Cl. ......................................... 235/492; 283/83
(58) Field of Classification Search ................ 235/492; 361/737; 283/83
See application file for complete search history.

(56) References Cited

U.S. PATENT DOCUMENTS

| 3,943,685 | A  | * | 3/1976  | Rayburn ........................ 53/73 |
| 5,486,022 | A  | * | 1/1996  | Crane ........................... 283/83 |
| 6,293,470 | B1 | * | 9/2001  | Asplund ..................... 235/487 |
| 6,830,192 | B1 | * | 12/2004 | Krul et al. ................... 235/492 |
| 2004/0154766 | A1 | * | 8/2004 | Rancien et al. ............. 162/140 |

FOREIGN PATENT DOCUMENTS

| DE | 196 30 648 A1 | 2/1998 |
| DE | 198 33 746 A1 | 2/2000 |
| EP | 1 254 765 A1 | 6/2002 |
| WO | WO 99/54842 | 10/1999 |

* cited by examiner

*Primary Examiner*—Daniel A Hess
(74) *Attorney, Agent, or Firm*—Thorp Reed & Armstrong, LLP; Paul D. Bangor, Jr.; Stephen H. Montgomery

(57) ABSTRACT

The invention relates to a method of manufacturing a security thread (1) having a microchip (2), comprising the steps of providing a support material on a substrate; softening said support material, preferably by heating said support material; depositing a microchip (2) on or at least partly in the softened support material; and curing said support material, preferably by cooling said support material. The invention also relates to the security thread (1) manufactured by the method, and to a document, preferably a paper document, comprising that security thread.

8 Claims, 2 Drawing Sheets

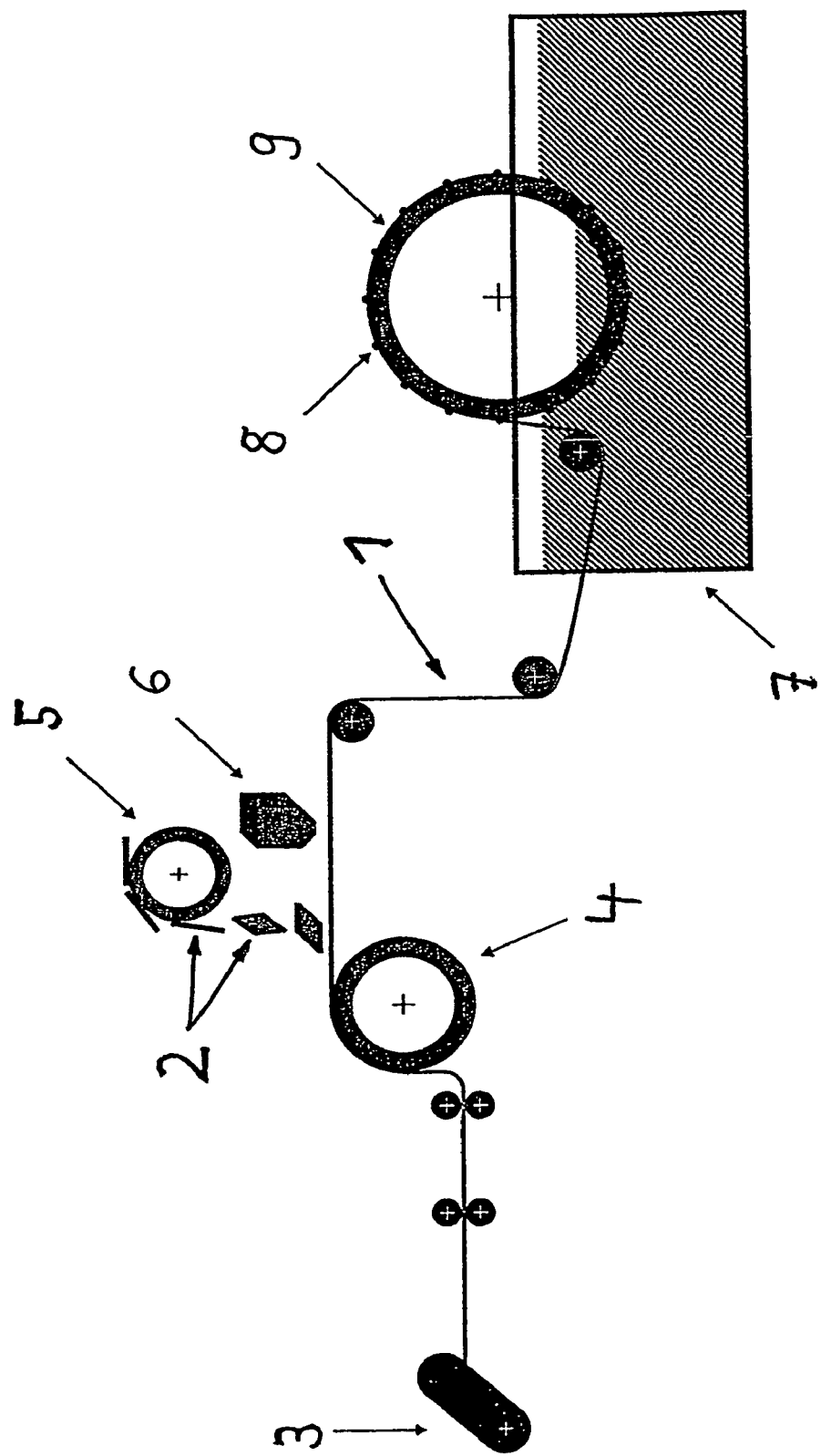

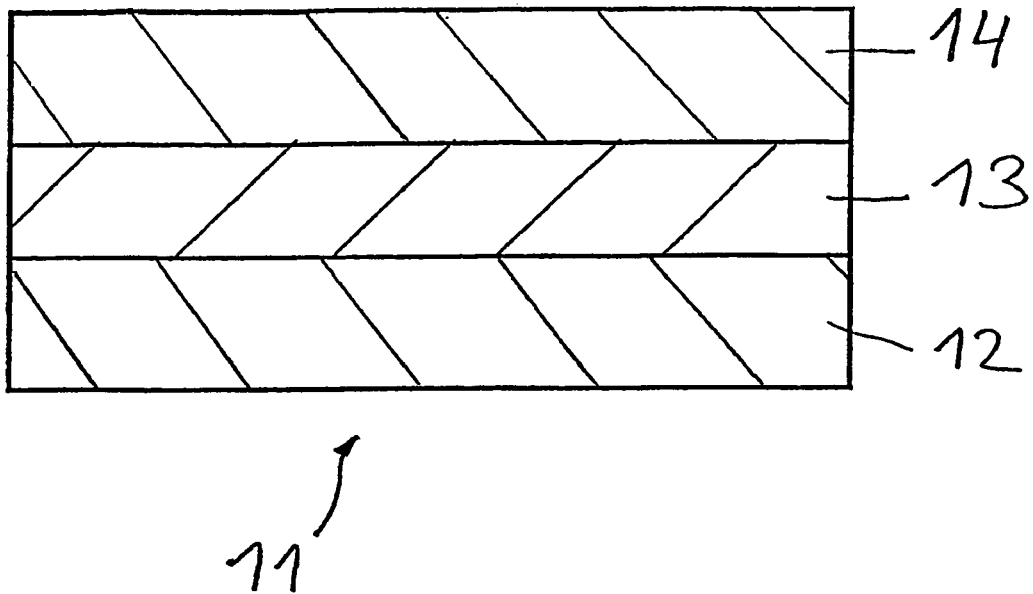
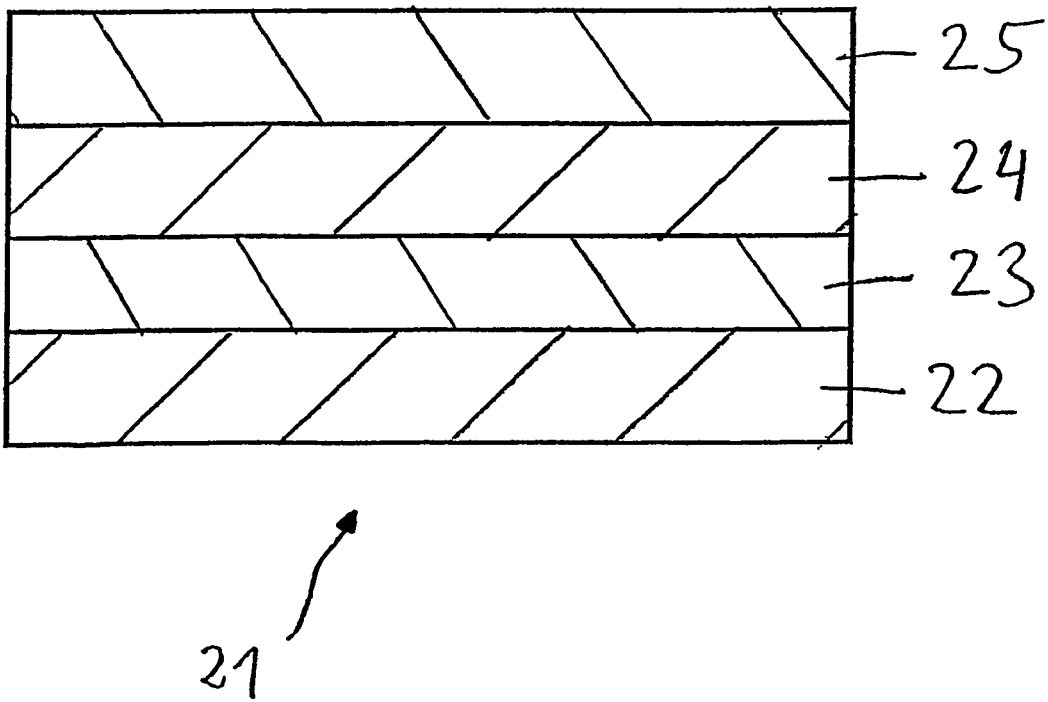

ial state to a
METHOD OF MANUFACTURING A SECURITY THREAD HAVING AN EMBEDDED MICROCHIP, SECURITY THREAD AND DOCUMENT COMPRISING THE THREAD The present invention relates to a method of manufacturing a security thread equipped with an embedded microchip, a security thread manufactured by that method, and a document comprising the thread.

It is already known to provide a document such as a bank note with a security thread in order to provide a possibility to verify whether the banknote is genuine or not. A method of manufacturing of such a security thread is disclosed in the Italian Patent Application MI2001A001914. For the public use, such security thread allows a simple visual examination.

However, it remains a need to provide the banknote with machine-readable information.

It is the object of the present invention, to provide under low costs a method of manufacturing a security thread, a security thread manufactured by the method, and a document comprising the thread, wherein the security thread additionally includes a data carrier having machine-readable information stored therein which can be reliably red out.

This object is solved by the method of manufacturing a security thread, a security thread manufactured by the method, and a document comprising the thread according to the claims.

The invention is further developed as it is defined in the dependent claims.

With the continuous progress of the technology, particularly of the miniaturisation technique of microprocessors, a microchip has been developed which has a suitable dimension for the use in plastic or paper documents.

Advantageously, the invention provides a method for precisely depositing such a microchip into a security thread, and also a security thread which is capable to accommodate the microchip. Thereby, the microchip is fixedly attached to or embedded in the thread. The security thus manufactured is suitable for banknotes, passports or passenger tickets, for instance.

Advantageously, the deposition of the microchip can be carried out in a paper mill during the production of the paper. The security thread having the microchip incorporated therein can be introduced into the paper by means of a conventional system as it is used in a paper mill.

In the following, the invention is described on the basis of preferred embodiments thereof with reference to the figures.

FIG. 1 shows a method of manufacturing a security thread equipped with a microchip according to an embodiment of the invention;

FIG. 2 shows a structural view of a thread according to an embodiment of the invention; and FIG. 3 shows a structural view of a thread according to another embodiment of the invention.

The embodiment shown in FIG. 1 is applied to the paper manufacture in a paper mill, wherein a security thread 1 is introduced in banknotes, for example. However, the invention is not restricted to this embodiment.

The security thread 1 is constituted by a substrate which can be a tape or film, preferably of polyester.

In a first step, the substrate, which usually is a transparent or printed polyester film, is metalized under vacuum with aluminium and/or copper etc. with a thickness from 6 to 50 µm.

Thereafter, on at least one side of the substrate, a suitable support material is applied, which can be quickly (preferably within a few milliseconds) brought from its solid state to a soft or "gum-like" state.

As the support material, a thermoplastic material containing a resin having a low melting point (approximately 70° C.) is applied by painting, transferring, spraying, for example. In more detail, as the thermoplastic material, wax, vinyl-polymer, polyurethane or any polymer or compound distributed in solvents on water basis or on solvent basis is suitable, provided that it has the capability to modify its state from solid to a soft or "gum-like" state. The amount of this material depends on the type and the capability of modifying its state. For example, wax, vinyl-polymers, polymers or parafina can be put in a solvent based varnish and applied on the film. Optionally, the thermoplastic material can be subjected to a roll embossing or stencil printing process wherein the thickness of deposition in a dried state is approximately 10 µm.

In order to enhance the adhesion of the thermoplastic material, a special treatment for enhancing the adhesion can be carried out before applying the thermoplastic material.

Once the varnish has been applied and dried, it provides a sealing to the atmosphere, and the film is cut in stripes having a width of approximately 0.5 to 6 mm, particularly if the thread 1 shall be introduced within the paper by means of a total embedding or windows technique.

Alternatively, the film is kept in larger sizes, if the film is transformed into tapes and is, therefore, applied on the surface of another final support.

If the thread 1 shall be introduced in the paper together with the microchip 2, the thread 1 preferably has a width of 2.5 mm which is necessary to accommodate a microchip 2, because a conventional microchip 2 has side lengths of 0.5 mm to 1.5 mm.

After cutting the film into threads 1, the threads 1 are winded up around bobbins (not shown) as they are usually used for the security threads 1.

The thus winded thread 1 is positioned on appropriate reels 3 which comprise a motor spindle that winds off the thread 1 in a controlled manner so as to maintain a constant output.

By winding off the thread 1, the thread 1 is heated by means of a contact with a heat cylinder 4. The method of heating and of modifying the state of the varnish can also be a mechanic operation by means of a contact of the polyester with a, heat source 4, for example. Alternatively, the thread 1 is radiated by a beam that emits heat such as a laser beam, an infrared beam or an ultraviolet beam (not shown).

Considering the heat-sensitive characteristic of waxes, several 10 µm of the previously deposited compound are softened (it is obvious that the softening can be performed by any heating system).

After the softening, the microchip 2 falls from an appropriate distributor 5 onto the thread 1, wherein the microchip 2 falling on the thread 1 is embedded therein.

When the microchip is appropriately deposited, a curing process of the support material is performed, preferably by cooling the support material. Directly after the cooling process by an air cooling means 6, the compound returns to its solid state and holds and supports the microchip 2. Also in this case, the cooling process can be performed in various ways.

At this point, the thread 1 is supplied together with the microchip 2 in the interior of a paper compound 7 when the paper is produced.

In this embodiment of the paper manufacture, the start of the impulses for the fall of the microchip 2 from the distributor 5 and the cooling process are controlled by the detection of a corresponding notch 8 in a watermark cylinder 9, for example. Thereby, the microchip 2 is introduced in register with the watermark of the banknote. As for the control means, any conventional means known in the field of the paper manufacture can be used.

Depending from the speed with which the paper is manufactured, and from the relative thickness of the varnish, when the varnish is still in the gum-like state and has already the microchip 2 deposited thereon, it may be used a pressing means (not shown) that provides two rubber layers or two rubber cylinders spaced to each other by a fixed gap therebetween and which compress the microchip 2 into the varnish until the microchip 2 is embedded therein.

As a numeric example, the polyester substrate may have a thickness of 10 μm, on which aluminium is deposited under vacuum with a thickness of 0.2 μm. On the aluminium, a vinyl protecting varnish is applied which has a thickness of approximately 2 μm. On the protecting layer, a heat-sensitive varnish is applied so as to obtain a layer of 10 μm of the heat-sensitive varnish in the dried state. As a result, the total thickness of the thread 1 is approximately 22 to 23 μm.

When the heat-sensitive varnish is activated and when the microchip 2 falls on it which has a thickness of 60 μm, for example, the microchip 2 can be embedded a few μm.

Then, thread 1 is optionally passed between two cylinders (not shown) of the pressing means which are spaced to each other with a gap of 75 μm so that that the microchip 2 is embedded for at least 8 to 9 μm into the heat-sensitive varnish.

It is obvious that the preferred numeral values can be varied according to the materials which are used, in particular the target material that thereafter will receive the thread 1 with the embedded microchip 2.

The advantage of the invention is the possibility to position the microchip 2 at a variable distance. Thereby, it is not necessary to use a pre-constructed thread magazine, for instance, which would involve excessive costs. Moreover, the thread 1 suitable for accommodating the microchip 2 and the microchip 2 itself are the same for all banknotes independently from the kind of the banknotes. On the other hand, during the manufacturing process in the paper mill, data or signals are programmable and machine-readable from the security thread 1.

In the following, embodiments of the structure of the thread will be described with reference to FIGS. 2 and 3. As an alternative to the thread 1 used in the embodiment of FIG. 1, the thread can be embodied in the following manner.

FIG. 2 shows a thread 11 comprising a substrate 12 of polyester or polypropylene.

On the substrate 12, a medium layer 13 is applied which carries specific characters, signs, data or any other information which are helpful for an individualisation of a document in which the thread 11 is to be inserted. The medium layer 13 preferably has a thickness of 6 to 50 μm.

This medium layer 13 may comprise a varnish or coloured inks (red, green, blue, yellow, for instance). The varnishes or inks may be applied sequentially and/or completely or partially overlapping. Alternatively, the varnish or ink may be mixed with the substrate of polymer. The medium layer 13 may absorb light having long or short wavelengths (about 360 nm or 254 nm). The medium layer 13 may comprises a fluorescent dye.

Alternatively, the medium layer 13 may comprise a varnish or an ink which exhibits a chromatic variation according to the diffraction angle. Also in this case, the varnish or the ink can be applied sequentially and/or completely or partially overlapping.

Alternatively, the medium layer 13 may comprise a magnetic ink having different coercitivities by applying the magnetic ink continuously, discontinuously or in a manner like SISMA which is a Mantegazza Patent.

Alternatively, the medium layer 13 may comprise images or holograms of any type, i.e. exelgrams, pixelgrams, dot matrix, depicted in a two dimensional or three dimensional manner.

Alternatively, the medium layer 13 may comprise a metallic material which may be applied under vacuum such as aluminium, copper, nickel having a characteristic of reflecting light or a larger gloss. It is obvious that the metallic materials may be applied in different quantities, thickness' and types.

The medium layer 13 constituted by any one of the above-mentioned with interruptions or even a partly lack of material. The materials may be applied in a negative or positive manner.

Alternatively, the medium layer 13 may comprise substances for checking the magnetoresistance or an inductivity such as "Micro Tag".

Alternatively, the medium layer 13 may comprise a varnish or an ink being conductive, transparent (for example polyaniline) or visual (for example a silver-based varnish or ink).

On the medium layer 13, as it is described above, a heat-sensitive support material 14 is applied. Preferably, the heat-sensitive material 14 is a thermoplastic having a thickness of about 10 μm.

FIG. 3 shows a structural view of a thread 21 according to another embodiment of the invention.

The thread 21 according to this embodiment includes the substrate 22 and the medium layer 23 in a same way as the thread 11 shown in FIG. 2.

Instead of the heat-sensitive support material, an adhesive support material or a glue support material 24 is applied on the medium layer 23. The adhesive support material 24 may have a thickness of about 8 μm. The microchip 2 is adhered to the adhesive support material 24.

Preferably, an additional siliconated layer 25 is applied on the adhesive support material 24. The siliconated layer 25 may comprise paper with a density of 45 to 90 g/m$^2$ or polyester having a thickness of 10 to 20 μm. Although it is not shown in the figures, the siliconated layer 25 can alternatively be applied on that side of the thread 21 which is opposite of the adhesive support material 24. This is advantageously in particular when the thread 21 is winded up around a bobbin (in general, the siliconated layer 25 may also be provided on the heat-sensitive material 24 of the thread according to the embodiment shown in FIG. 2).

Alternatively, a thread may comprise both the heat-sensitive support material 14 and the adhesive support material 24.

The invention has been described with reference to the preferred embodiment. However, it is obvious for the skilled person that the invention can be modified in various ways. Such modifications are also within the scope of protection which is defined by the claims.

For example, the microchip 2 may comprise an antenna (not shown) for a wireless data transmission.

The invention claimed is:

1. A method of manufacturing a security thread or strip introduceable in banknotes, said security thread or strip having a microchip, comprising the steps of:

providing a support material on a substrate to form a thread or strip;

softening said support material, by heating said support material;

depositing a microchip on or at least partly in the softened support material; and curing said support material, by cooling said support material.

2. The method of manufacturing a security thread according to claim 1, wherein said support material is at least one of a heat-sensitive material, a thermoplastic material containing a resin having a low melting point, a wax, a vinyl-polymer, a polyurethane or any polymer or compound distributed in water based solvents or in any solvent that has the characteristics to modify its state from solid to soft.

3. The method of manufacturing a security thread according to claim 1, wherein, in the step of softening said support material, the support material is heated by at least one of contact with a heating means, by heat radiation, by an infrared beam, by ultraviolet beam and by laser beam.

4. The method of manufacturing a security thread according to claim 1, wherein, in the step of depositing said microchip, the microchip falls on the softened support material and sinks at least partly into the support material by its own gravity.

5. The method of manufacturing a security thread according to claim 1, wherein, in the step of depositing said support chip, said microchip is positioned on the support material, and thereafter, when the support material is still soft, the microchip is pressed into the support material by a pressing means.

6. The method of manufacturing a security thread according to claim 1, comprising a step of winding up the security thread around a spool.

7. The method of manufacturing a security thread according to claim 6, wherein a timing of softening said support material, depositing said microchip and/or curing said support material is set in accordance to a winding operation of the spool.

8. The method of manufacturing a security thread according to claim 6 or claim 7, wherein said spool is a watermarking cylinder which has register notches and transports the security thread into a paper compound, and said timing of softening said support material, depositing said microchip and/or curing said support material is set in accordance to a detection of said register notches.

\* \* \* \* \*